United States Patent
Winkle et al.

(10) Patent No.: US 11,074,545 B2
(45) Date of Patent: Jul. 27, 2021

(54) SYSTEMS AND METHODS FOR DELIVERING PRODUCTS VIA UNMANNED AERIAL VEHICLES TO DELIVERY LOCATIONS DESIGNATED BY CUSTOMERS

(71) Applicant: Walmart Apollo, LLC, Bentonville, AR (US)

(72) Inventors: David C. Winkle, Bella Vista, AR (US); Donald R. High, Noel, MO (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 496 days.

(21) Appl. No.: 15/850,197

(22) Filed: Dec. 21, 2017

(65) Prior Publication Data

US 2018/0174102 A1 Jun. 21, 2018

Related U.S. Application Data (60) Provisional application No. 62/437,297, filed on Dec. 21, 2016.

(51) Int. Cl.
| | | |
|---|---|---|
| G06Q 10/08 | (2012.01) | |
| B64C 39/02 | (2006.01) | |
| B64D 11/06 | (2006.01) | |
| G08G 5/00 | (2006.01) | |

(52) U.S. Cl.
CPC ..... *G06Q 10/08355* (2013.01); *B64C 39/024* (2013.01); *B64D 11/0624* (2014.12); *G06Q 10/0832* (2013.01); *B64C 2201/127* (2013.01); *B64C 2201/128* (2013.01); *B64C 2201/145* (2013.01); *G08G 5/0069* (2013.01)

(58) Field of Classification Search
CPC .............. G06Q 10/08; B64C 2201/127; B64C 2201/128; B64C 2201/145; G08G 5/0069
See application file for complete search history.

(56) References Cited

U.S. PATENT DOCUMENTS

| | | |
|---|---|---|
| 9,070,101 B2 | 6/2015 | Abhyanker |
| 9,305,280 B1 | 4/2016 | Berg |
| 9,307,383 B1 | 4/2016 | Graham |
| 2014/0032034 A1 | 1/2014 | Raptopoulos |
| 2014/0254896 A1 | 9/2014 | Zhou |
| 2015/0120094 A1* | 4/2015 | Kimchi ............... G05D 1/00 701/3 |

(Continued)

OTHER PUBLICATIONS

Costa, Bruno Sielly Jales, et al. "A visual protocol for autonomous landing of unmanned aerial vehicles based on fuzzy matching and evolving clustering." 2015 IEEE International Conference on Fuzzy Systems (FUZZ-IEEE). IEEE, 2015. (Year: 2015).*

(Continued)

*Primary Examiner* — Scott M Tungate
(74) *Attorney, Agent, or Firm* — Fitch, Even, Tabin & Flannery, LLP (57) ABSTRACT

In some embodiments, methods and systems are provided that provide for facilitating delivery, via unmanned aerial vehicles, of products ordered by a customer of a retailer to a customer-selected physical location of a person other than the customer.

14 Claims, 4 Drawing Sheets

(56) References Cited

U.S. PATENT DOCUMENTS

| | | |
|---|---|---|
| 2016/0031559 A1 | 2/2016 | Zang |
| 2016/0068265 A1 | 3/2016 | Hoareau |
| 2016/0159496 A1 | 6/2016 | O'Toole |
| 2017/0129603 A1* | 5/2017 | Raptopoulos ........ G05D 1/0676 |
| 2017/0357972 A1* | 12/2017 | Van Os .................. G06Q 20/29 |
| 2018/0107211 A1* | 4/2018 | Schubert ................ G05D 1/101 |

OTHER PUBLICATIONS

Lavars, Nick; "Amazon working on drones that will deliver items to wherever you are"; http://www.gizmag.com/amazondronesgpslocationdelivery/37431/; May 10, 2015; pp. 1-6.
PCT; App. No. PCT/US2017/066990; International Search Report and Written Opinion dated Mar. 8, 2018.

* cited by examiner

SYSTEMS AND METHODS FOR DELIVERING PRODUCTS VIA UNMANNED AERIAL VEHICLES TO DELIVERY LOCATIONS DESIGNATED BY CUSTOMERS

CROSS-REFERENCE TO RELATED APPLICATION

This application claims the benefit of U.S. Provisional Application No. 62/437,297, filed Dec. 21, 2016, which is incorporated herein by reference in its entirety.

TECHNICAL FIELD

This invention relates generally to providing purchased products to customers and, in particular, to delivering products purchased by customers via unmanned aerial vehicles.

BACKGROUND

Customers often purchase products from retailers over the internet. Generally, the products purchased by a customer are delivered to a defined physical address provided by the customer, for example, a home where the customer lives, or an office where the customer works. However, customers are often away from their home and not at their work, and sometimes require delivery of products to their (or other intended recipients') away-from-home or away-from-office location, which may be a public place not having a defined street address.

BRIEF DESCRIPTION OF THE DRAWINGS

Disclosed herein are embodiments of systems, apparatuses, methods, and systems pertaining to delivering, via unmanned aerial vehicles, products ordered by a customer to a physical location of a person other than the customer. This description includes drawings, wherein.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for facilitating delivery, via unmanned aerial vehicles, of products ordered by customers of a retailer to locations designated by the customers.

In some embodiments, a system for facilitating delivery of products ordered by a customer of a retailer to a physical location of a person other than the customer of the retailer via an unmanned aerial vehicle includes an order processing server of the retailer configured to process an order for a product placed by a customer. The order for the product placed by the customer specifies that the product be delivered to a physical location of the person other than the customer. The system also includes a computing device of the retailer including a processor-based control circuit, the computing device of the retailer configured to obtain global positioning system (GPS) coordinates of the physical location of the person other than the customer. The control circuit is configured to analyze the obtained GPS coordinates of the physical location of the person other than the customer and to obtain a product drop off zone for an unmanned aerial vehicle carrying the product ordered by the customer at the physical location of the person other than the customer, and to transmit a first electronic notification to the unmanned aerial vehicle, the first electronic notification including landing instructions to guide the unmanned aerial vehicle to land at the product drop off zone. The unmanned delivery vehicle, upon receipt of the first electronic notification from the computing device of the retailer, is configured to land at the product drop off zone based on the landing instructions, and to permit the person other than the customer to retrieve the product ordered by the customer from the unmanned delivery vehicle.

In other embodiments, a method for facilitating delivery of products ordered by a customer of a retailer to a physical location of a person other than the customer of the retailer via an unmanned aerial vehicle, the method including: providing an order processing server of the retailer configured to process an order for a product placed by a customer, the order for the product placed by the customer specifying that the product be delivered to a physical location of the person other than the customer; providing a computing device of the retailer including a processor-based control circuit, the computing device of the retailer configured to obtain GPS coordinates of the physical location of the person other than the customer; analyzing, via the control circuit of the computing device of the retailer, the obtained GPS coordinates of the physical location of the person other than the customer; obtaining, via the control circuit of the computing device of the retailer, a product drop off zone for an unmanned aerial vehicle carrying the product ordered by the customer at the physical location of the person other than the customer; transmitting a first electronic notification to the unmanned aerial vehicle, the first electronic notification including landing instructions to guide the unmanned aerial vehicle to land at the product drop off zone, the unmanned delivery vehicle, upon receipt of the first electronic notification from the computing device of the retailer, landing at the product drop off zone based on the landing instructions and permitting the person other than the customer to retrieve the product ordered by the customer from the unmanned delivery vehicle.

Figure 1:
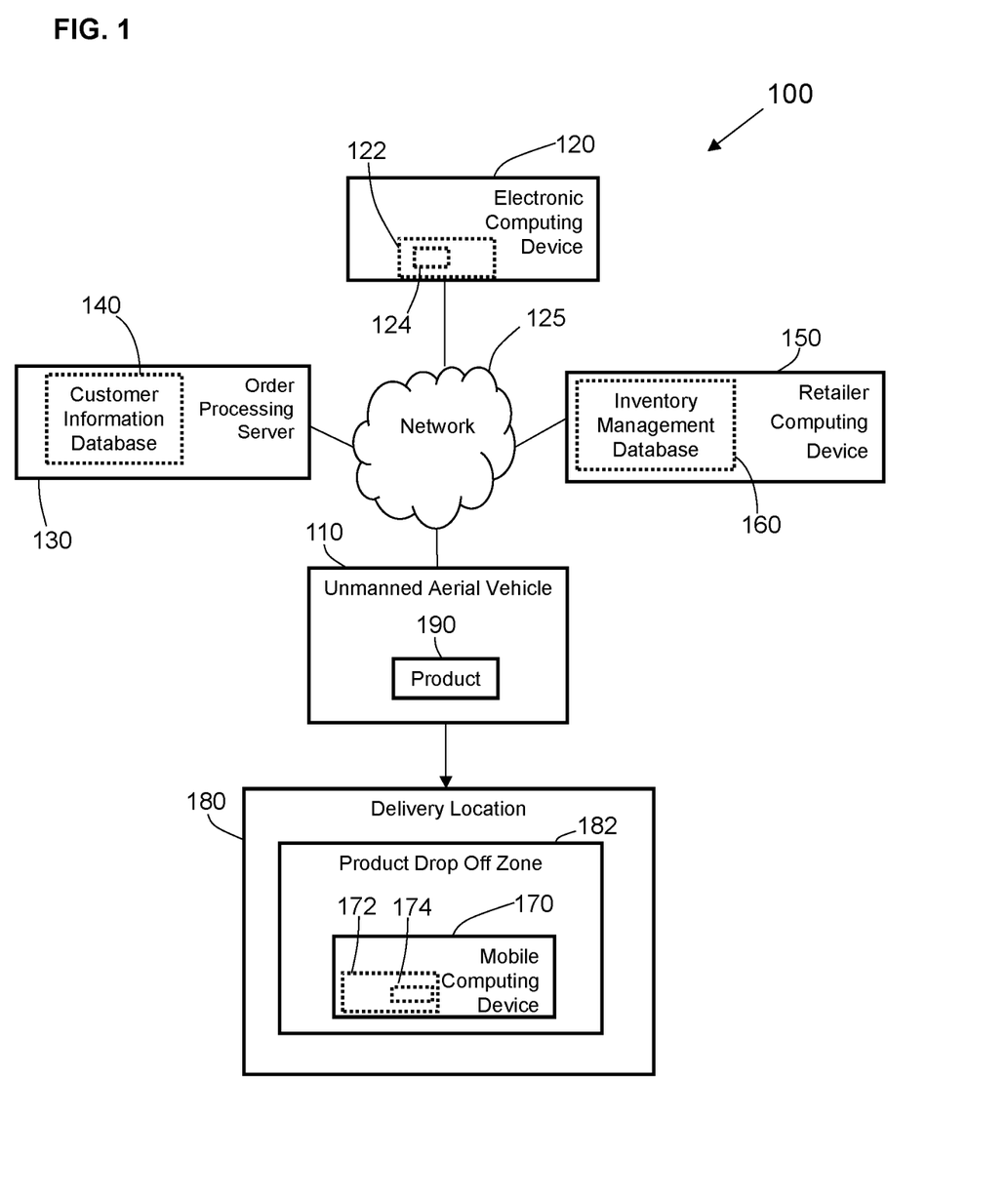
FIG. 1 is a diagram of a system for facilitating delivery of products ordered by a customer of a retailer to a physical location of a person other than the customer of the retailer via an unmanned aerial vehicle in accordance with some embodiments.

FIG. 1 shows an embodiment of a system 100 for facilitating delivery, via an unmanned aerial vehicle (UAV) 110, of products 190 ordered by a customer of a retailer to a customer-designated physical location 180 of a person other than the customer. It will be understood that the details of this example are intended to serve in an illustrative capacity and are not necessarily intended to suggest any limitations in regards to the present teachings. The retailer may be any entity operating as a brick-and-mortar physical location and/or a website accessible, for example, via an intranet, internet, or another network, by way of which products 190 may be ordered by a consumer (e.g., a new or existing customer of the retailer). A customer may be an individual or business entity. Exemplary products 190 that may be ordered by the customer via the system 100 may include, but are not limited to, general-purpose consumer goods and consumable products (e.g., food items, medications, or the like).

The exemplary system 100 depicted in FIG. 1 includes an order processing server 130 of the retailer configured to process a purchase order by the customer for one or more products 190. The order processing server 130 may be implemented as one server at one location, or as multiple interconnected servers stored at multiple locations operated by the retailer, or for the retailer. As described in more detail below, the order processing server 130 may communicate with one or more electronic devices of system 100 via a network 125. The network 125 may be a wide-area network (WAN), a local area network (LAN), a personal area network (PAN), a wireless local area network (WLAN), Wi-Fi, Zigbee, Bluetooth, or any other internet or intranet network, or combinations of such networks. Generally, communication between various electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 is coupled to a customer information database 140. In some embodiments, the customer information database 140 may be configured to store information associated with customers of the retailer who order products 190 from the retailer. In some embodiments, the customer information database 140 may store electronic information including but not limited to: personal information of the customers, including payment method information, billing address, previous delivery addresses, phone number, contacts and/or friend list, product order history, pending order status, product order options, as well as product delivery options (e.g., delivery by UAV) of the customer.

The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based. In some embodiments, the order processing server 130 may be also coupled to an electronic database configured to store information associated with the inventory of products 190 made available by the retailer to the customer. In other words, while the order processing server 130 is illustrated in FIG. 1 as being coupled to one electronic database (i.e., customer information database 140), it will be appreciated that the order processing server 130 may be additionally coupled to an electronic database akin to the inventory management database 160 configured to store product inventory information. In some embodiments, the customer information database 140 and the inventory management database 160 may be merged into one, such that the order processing server 130 is coupled to one electronic database including both the retailer's customer information and the retailer's inventory management information.

In some embodiments, when a customer initially sets up an online account with the retailer, the system 100 (i.e., order processing server 130 or another server on the system 100 dedicated to new customer sign-up) is configured to permit the customer to generate a customer profile including personal information of the customer (e.g., name, address, phone number, and the like), payment methods (e.g., credit card information), shopping and/or auto-replenish list of the customer, and product delivery settings of the customer (e.g., preferred delivery address and/or preferred delivery method (e.g., via UAV)). It will be appreciated that the customer may select new options and/or update previously selected options at any time after setting up the account with the retailer. In some embodiments, the personal information of the customer and any product delivery options selected by the customer are stored in the customer information database 140 for subsequent retrieval by the order processing server 130 and/or by a retailer computing device 150 (e.g., in response to a login request by the customer, or product order placement by the customer).

The customer may access the order processing server 130 of the retailer via an electronic computing device 120, which may be a stationary, portable, and/or hand-held electronic device, for example, a desktop computer, a laptop computer, a tablet, a mobile phone, or any other electronic, processor-based device that may be configured for data entry and communication with the order processing server 130 over the network 125. In some embodiments, the customer may access the order processing server 130 of the retailer via a graphical interface 122 displayed to the customer on the electronic computing device 120. The graphical interface 122 may include one or more graphical input fields 124 in the form of menu options and/or sub-interfaces that permit the customer to place an order for one or more products 190 and to select a delivery location 180 and/or delivery via UAV 110 option for one or more products 190 ordered by the customer.

In some embodiments, instead of being a mobile device (e.g., hand-held mobile "smart" phone) of the consumer as described above, the electronic computing device 120 may be a stationary or portable electronic device installed or otherwise operatively connected at a brick-and-mortar facility of a retailer, or at another location or facility accessible to the public (e.g., a shopping mall, a parking lot, a courtyard near a commercial or residential building, a park, a beach, etc.). Examples of such stationary electronic computing devices may include, but are not limited to, a kiosk or a kiosk-type computing station available to the customers of the retailer.

In some embodiments, as the customer is attempting to connect (e.g., via the electronic computing device 120 such as a cell phone) to the retailer's website, the order processing server 130 is configured to request a verification of the identity (e.g., username/password) of the customer. The order processing server 130 may first verify the identity of the customer (e.g., by comparing the username/password data entered by the customer into the login interface against username/password data in the profile of the customer stored in the customer information database 140). The order processing server 130 may then associate the customer profile with the identity of the customer, retrieve the customer profile from the customer information database 140 based on information stored in the profile, and send the retrieved customer account information to the electronic computing device 120, which includes a graphical interface 122 including one or more input fields 124 that permit the customer to customize various options relating to the ordering of products 190 from the retailer and/or the delivering of the customer-ordered products 190 to the customer or to a person other than the customer.

In some embodiments, after placing an on order for one or more products 190 via the order processing server 130 using the graphical interface 122 of the electronic computing device 120, the customer can specify that the product 190 ordered by the customer is to be delivered to a delivery location 180 designated by the customer, with the delivery location 180 being a location of a person other than the customer who ordered the product 190. In some embodiments, the customer is permitted to specify that the product(s) 190 ordered by the customer be delivered to a delivery location 180 that is based on a physical location of a person other than the customer by specifying a physical location on a map where delivery is to be made, and/or by specifying a phone number (or another identifying criteria) of the mobile computing device 170 of the person other than the customer, such that the location of the mobile computing device 170 may be determined, and delivery of the product 190 by the UAV 110 can be made to the physical location 180 of person other than the customer based on the physical location of the mobile computing device 170. In yet other embodiments, the customer is permitted to specify that the product(s) 190 ordered by the customer be delivered to a delivery location 180 that is based on a physical location of a smart locker by specifying a physical location on a map where the smart locker is located, such that the location of the smart locker may be determined, and delivery of the product 190 by the UAV 110 can be made to the physical location of the smart locker.

In some embodiments, the customer is also permitted to specify that the product(s) 190 ordered by the customer be delivered to a delivery location 180 that is based on a physical location of the customer by specifying a physical location on a map where delivery is to be made. For example, as will be described in more detail below, in some embodiments, the graphical interface 122 of the electronic computing device 120 is configured to display a "Deliver Here" icon, which may be selected (e.g., touched) by the customer to activate a delivery of the products 190 ordered by the customer to a delivery location 180 (indicated via a cursor within the graphical interface 122) that is selected by the customer. In some configurations, a customer who wants a product 190 delivered to a specific delivery location 180 via a UAV 110 can activate the graphical interface 122 on the electronic computing device 120, pull up a graphical map within the graphical interface 122, and press a graphical "Deliver Here" button within the graphical interface 122 when a pointer or cursor is positioned over a desired delivery location 180 (e.g., where a person other than the customer who placed the order is located, or where a smart locker is located). In one approach, the "Deliver Here" button within the graphical interface 122 overlays a portion of, or appears within a graphical image of a map (e.g., satellite or aerial image) that visibly indicates the location of the customer or the smart locker where the product 190 is to be delivered.

In some embodiments, the graphical interface 122 may be a retailer-associated mobile application (app) installed on the electronic computing device 120 and configured to display various above-described menu options, notifications, and/or alerts for the customer. In some embodiments, electronic alerts may be transmitted to the electronic computing device 120 via the network 125 from the retailer computing device 150 and/or from the order processing server 130 and displayed to the customer via the graphical interface 122.

In some embodiments, prior to and/or after the commencement of a delivery attempt of the products 190 ordered by the customer via a UAV 110 to the delivery location 180, the retailer computing device 150 is configured to obtain GPS coordinates associated with the delivery location 180 selected by the customer and/or GPS coordinates associated with the electronic computing device 120 of the customer (if delivery to the customer is being attempted) or the mobile computing device 170 of a person other than the customer (if delivery to a person other than the customer is being attempted). In one approach, the retailer computing device 150 is configured to determine and set a product drop off zone 182 within the delivery location 180 based on the obtained GPS coordinates of the delivery location 180, electronic computing device 120 of the customer, smart locker where the product 190 is to be delivered for a person other than the customer, or the mobile computing device 170 of the person other than the customer.

In some embodiments, the order processing server 130 is configured to receive and process an order by a customer for a product 190 from the electronic computing device 120 of the customer, to receive and process payment for the product 190 from the customer, and to transmit (e.g., to the retailer computing device 150 via the network 125) the customer's selection of an option to have the ordered products 190 delivered to a person other than the customer at a delivery location 180 designated by the customer who placed the order. It will be appreciated that while the order processing server 130 and the retailer computing device 150 may be located at separate physical locations (e.g., regional/central data center, product distribution center, retail store, or the like), the retailer computing device 150 and the order processing server 130 of the system 100, in some embodiments, may be confined to a single facility.

The retailer computing device 150 may be a stationary or portable electronic device, for example, a desktop computer, a laptop computer, a tablet, a mobile phone, or any other electronic device including a processor-based control circuit (i.e., control unit). For purposes of this specification, the term "retailer computing device" will be understood to refer to a computing device owned by the retailer or any computing device owned and/or operated by an entity (e.g., manufacturer, delivery service, worker of the retailer) having an obligation to deliver products 190 to or for the retailer. In the embodiment of FIG. 1, the retailer computing device 150 is configured for data entry and processing as well as for communication with other devices of system 100 via the network 125 which, as described above. In some embodiments, as will be described below, the retailer computing device 150 is configured to access one or more of the inventory management database 160 and customer information database 140 via the network 125 to facilitate delivery of the products 190 ordered by a customer to a delivery location 180 designated for delivery by the customer.

In the exemplary system 100 of FIG. 1, the retailer computing device 150 is in two-way communication with the UAV 110 via the network 125. For example, the retailer computing device 150 is configured, in some approaches, to transmit at least one signal to the UAV 110 to cause the UAV 110 to move toward and/or away from the delivery location 180 designated by the customer in order to transport, pick up, and/or drop off the product or products 190 ordered by the customer. In some embodiments, the retailer computing device 150 is configured to cause the UAV 110 to travel to the delivery location 180 designated by the customer, determine a product drop off zone 182 at the delivery location 180, land onto or hover over the determined product drop off zone 182, and permit the customer or a person other than the customer to retrieve the delivered products 190 from the UAV 110, for example, after an identity verification by the UAV 110 (or by the retailer computing device 150). In some embodiments, the retailer computing device 150 is configured to determine whether one or more environmental conditions for the UAV 110 to land at the product drop off zone 182 are met prior to instructing the UAV 110 to land at the product drop off zone 182 in order to permit the customer or a customer-designated person other than the customer to retrieve one or more products 190 ordered by the customer from the UAV 110.

Figure 3:
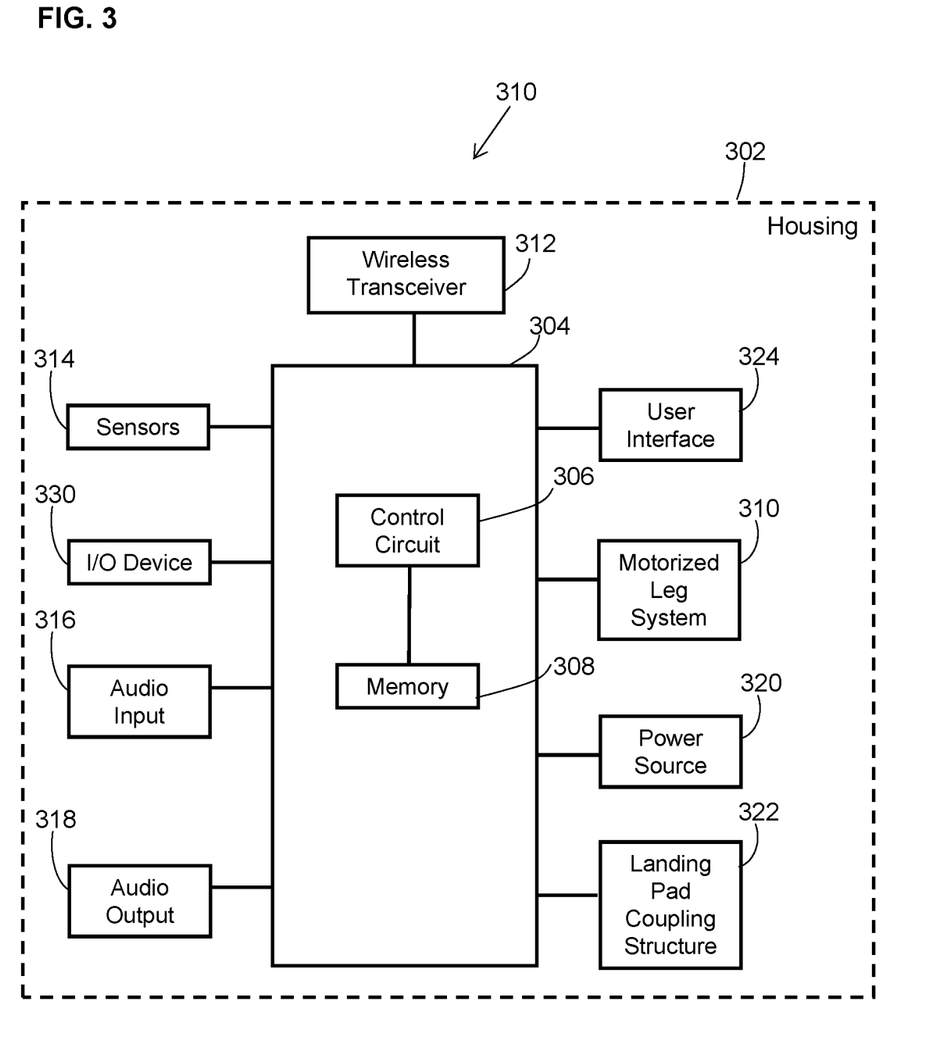
FIG. 3 comprises a block diagram of a UAV as configured in accordance with various embodiments of these teachings.

The UAV 110, which will be discussed in more detail below with reference to FIG. 3, is generally an unmanned aerial vehicle configured to autonomously traverse one or more intended environments in accordance with one or more routes and/or determined paths, and typically without the intervention of a human or a remote computing device, while retaining the products 190 therein and delivering the products 190 to the delivery location 180 and/or to perform one or more tasks. In some instances, however, a remote operator or a remote computer (e.g., retailer computing device 150) may temporarily or permanently take over operation of the UAV 110 using feedback information from the UAV 110 (e.g., audio and/or video content, sensor information, etc.) communicated to a remote navigation center and/or central control system (e.g., via network 125 or other similar distributed network).

While only one UAV 110 is shown in FIG. 1 for ease of illustration, it will be appreciated that in some embodiments, the retailer computing device 150 may communicate with, and/or provide flight route instructions to more than one (e.g., 5, 10, 20, 50, 100, 1000, or more) UAVs 110 simultaneously to guide the UAVs 110 to transport products to their respective delivery locations 180 and/or to land at their respective product drop off zones 182 along flight routes predetermined and/or modified in real-time by the retailer computing device 150.

Figure 2:
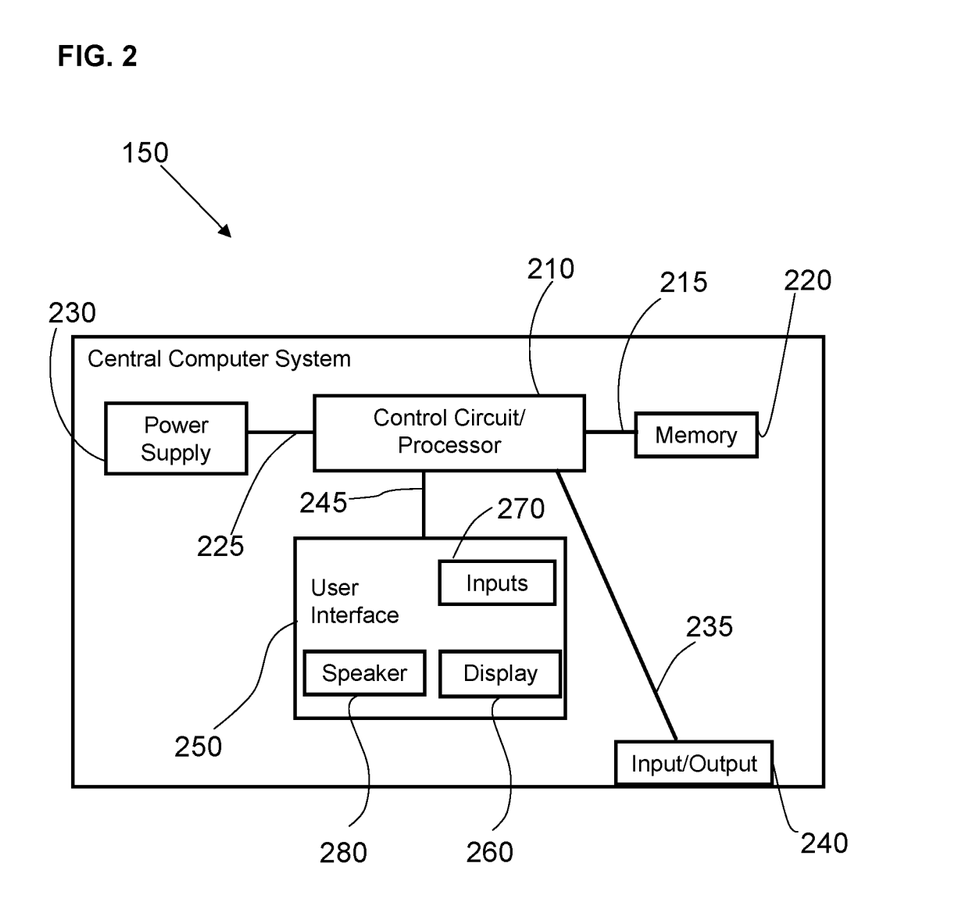
FIG. 2 is a functional diagram of an exemplary retailer computing device usable with the system of FIG. 1 in accordance with some embodiments.

With reference to FIG. 2, an exemplary retailer computing device 150 configured for use with the systems and methods described herein may include a control unit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 210 of the retailer computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Thus, the memory and/or the control circuit may be referred to as a non-transitory medium or non-transitory computer readable medium.

The control circuit 210 of the retailer computing device 150 is also electrically coupled via a connection 235 to an input/output 240 that can receive signals from the order processing server 130 (e.g., data from the customer information database 140 relating to an order for a product 190 placed by the customer and/or information (e.g., GPS coordinates) associated with the delivery location 180 selected by the customer) or from any other source that can communicate with the retailer computing device 150 via a wired or wireless connection. The input/output 240 of the retailer computing device 150 can also send signals to the order processing server 130 (e.g., electronic notification confirming retrieval of the product 190 by the customer or a person other than the customer from the UAV 110), or to any other device in wired or wireless communication with the retailer computing device 150.

In the embodiment shown in FIG. 2, the processor-based control circuit 210 of the retailer computing device 150 is electrically coupled via a connection 245 to a user interface 250, which may include a visual display or display screen 260 (e.g., LED screen) and/or button input 270 that provide the user interface 250 with the ability to permit an operator of the retailer computing device 150 to manually control the retailer computing device 150 by inputting commands via touch-screen and/or button operation and/or voice commands to, for example, to communicate with the electronic computing device 120 and/or an UAV 110. It will be appreciated that the performance of such functions by the processor-based control circuit 210 of the retailer computing device 150 is not dependent on a human operator, and that the control circuit 210 may be programmed to perform such functions without a human operator.

In some embodiments, the display screen 260 of retailer computing device 150 is configured to display various graphical interface-based menus, options, and/or alerts that may be transmitted to the retailer computing device 150 and displayed on the display screen 260 in connection with various aspects of the order placed by the customer. The inputs 270 of the retailer computing device 150 may be configured to permit an operator to navigate through the on-screen menus on the retailer computing device 150 and make changes and/or updates to the delivery location 180 designated by the customer for delivery of the product 190 and/or to the product drop off zone 182 determined by the control circuit 210 of the retailer computing device 150. It will be appreciated that the display screen 260 may be configured as both a display screen and an input 270 (e.g., a touch-screen that permits an operator to press on the display screen 260 to enter text and/or execute commands.)

In some embodiments, the control circuit 210 of the retailer computing device 150 is programmed to determine that one or more products 190 ordered by the customer via the order processing server 130 is to be delivered to a person other than the customer at a delivery location 180 specified by the customer on a map within the graphical interface 122 of the electronic computing device 120. For example, as discussed above, when the customer places an order for one or more products 190 via the order processing server 130, the customer is provided with an input field 124 on the graphical interface 122 of the electronic computing device 120 (which may be a stationary kiosk or kiosk-like computing station, or a mobile smart phone as discussed above), prompting the customer to select a delivery option, with one of the available options being delivery of the product 190 via a UAV 110 to a customer-specified location of a person other than the customer. In some embodiments, the control circuit 210 of the retailer computing device 150 is programmed to authorize commencement of a delivery attempt of the product 190 to a person other than the customer after a verification that GPS coordinates of the customer-specified delivery location 180 or of a person other than the customer to whom delivery is desired have been obtained.

In one aspect, prior to, or after the commencement of the delivery attempt of one or more products 190 via the UAV 110 to the delivery location 180 that is designated by the customer, or to a delivery location 180 determined based on real-time GPS location tracking of the mobile computing device 170 of the person who is the intended recipient of the delivery, the control circuit 210 of the retailer computing device 150 is programmed to obtain GPS coordinates of the delivery location 180 where the product 190 is to be delivered. For example, in embodiments, where the customer requested delivery of a product 190 or products 190 to a specific geographic location (e.g., landmark, physical address, etc.), or indicated that the products 190 are to be delivered to a location of a mobile computing device 170 of a person other than the customer (who is the intended delivery recipient), the control circuit 210 may obtain the GPS coordinates associated with the delivery location 180 from the customer information database 140 (or directly via a transmission from the delivery recipient's mobile computing device 170.

In some embodiments, the control circuit 210 of the retailer computing device 150 automatically generates a travel route for the UAV 110 from its origin to its destination. In some embodiments, this route is based on a starting location of a UAV 110 (e.g., a deployment station or the like) and the intended destination of the UAV 110 (e.g., delivery location 180 and/or drop off zone 182). In some aspects, the retailer computing device 150 may calculate multiple possible optimum routes. The retailer computing device 150 is capable of integrating 2D and 3D maps of the navigable space of the UAV 110 with physical locations of objects at the origin/destination locations. After the retailer computing device 150 maps all objects to specific locations using algorithms, measurements, and GPS geo-location, for example, grids may be applied sectioning off the maps into access ways and blocked sections, enabling the UAV 110 to use such grids for navigation and recognition. The grids may be applied to 2D horizontal maps along with 3D models. Such grids may start at a higher unit level and then can be broken down into smaller units of measure by the retailer computing device 150 when needed to provide more accuracy.

In some embodiments, after obtaining GPS coordinates associated with the delivery location 180, the control circuit 210 of the retailer computing device 150 is programmed to obtain data indicating locations of other buildings, structures, obstructions, and/or no-fly zones associated with the delivery location 180, and to determine a target landing zone (i.e., drop off zone 182) within the confines of the delivery location 180. In some aspects, the target landing zone of the UAV 110 can be 1 meter in radius, 2 meters in radius, 3 meters in radius, etc. After the product drop off zone 182 is determined by the control circuit 210 of the retailer computing device 150, the control circuit 210 causes the retailer computing device to send a signal over the network 125 that dispatches the UAV 110 to the delivery location 180 and/or the product drop off zone 182 as discussed above. In some aspects, such a signal includes the GPS coordinates of the product drop off zone 182.

In some embodiments, the retailer computing device 150 may guide the landing of the UAV 110 onto the product drop off zone 182 based not only on GPS coordinates of the product drop off zone, but also on digital images (still photos or videos) of the product drop off zone 182 that are transmitted over the network 125 to the retailer computing device 150 either from the electronic device of the intended recipient of the delivery, or from the UAV 110 itself. In one aspect, the graphical interface 172 of the mobile computing device 170 of the person other than the customer includes a camera button configured to permit the person other than the customer to snap, via the mobile computing device 170 of the person of than the customer, a first digital photograph of the landing location (i.e., product drop off zone 182). Similarly, a UAV 110 according to some configurations includes a sensor 114 in the form of a digital camera configured to snap still photos or acquire real-time video of the product drop off zone 182 as the UAV 110 is hovering over the product drop off zone 182.

In some embodiments, the retailer computing device 150 is configured to receive a still digital photograph (or digital video) of the product drop off zone 182 from the mobile computing device 170 of the person to whom delivery is being made and/or from the UAV 110. In such embodiments, the control circuit 210 of the retailer computing device 150 is programmed to analyze the digital images received from the mobile computing device 170 and/or from the UAV 110, and to transmit a s signal over the network 125 to the UAV 110 that includes the landing instructions that guide the landing of the UAV 110 onto the product drop off zone 182 based on the received and analyzed digital images. In some aspects, the control circuit 210 of the retailer computing device 150 is configured to receive a first digital photograph of the product drop off zone 182 from the mobile computing device 170 and a second digital photograph from the UAV 110, and to compare the first and second digital photographs to verify the environmental features of the product drop off zone 182, and to transmit a signal to the UAV including the landing instructions that guide the landing of the UAV 110 onto the product drop off zone 182 based on the comparison of the first and second digital photographs.

In some embodiments, when the delivery of the product 190 via the UAV 110 is in progress, and more specifically, after the UAV 110 has arrived at the delivery location 180, the control circuit 210 is configured to receive, via the network 125, an authentication of an identity of the customer (or of the person designated as the delivery recipient by the customer) attempting to retrieve the product 190 from the UAV 110. In one aspect, the UAV 110 includes a video camera configured to visually inspect a physical identification card (e.g., Driver's License) of the customer or the intended person other than the customer and to generate identity detection data. The UAV 110 may then transmit such identity detection data over the network 125 to the retailer computing device 150, after which the control circuit 210 of the retailer computing device 150 is configured to obtain (e.g., from the customer information database 140) authentic identification data associated with the customer or the intended person other than the customer to determine if there is a match.

The control circuit 210 is further configured to send a return signal (via the input/output 240) to the UAV 110 to instruct the UAV 110 as to whether or not to grant access to a storage space of the UAV 110 to the customer or the person other than the customer who is attempting to accept delivery, based on whether the identity detection data associated with the customer or person attempting to accept delivery matched the authentic identification data stored in the customer information database 140. In some embodiments, the control circuit 210 is configured to authorize (e.g., via a transmission of a signal over the network 125 to the UAV 110) the UAV 110 to unlock the storage space and permit the product 190 to be retrieved therefrom based on an authentication of the identity of the customer or other person, which may be performed as described above. In one aspect, upon a successful completion of a delivery of the product 190 to the customer or person other than the customer at the delivery location 180, the control circuit is 210 of the retailer computing device 150 is configured to receive, over the network 125, from the electronic computing device 120, mobile computing device 170, and/or from the UAV 110, an electronic confirmation that the product 190 has been successfully delivered by the UAV 110.

In some embodiments, the control circuit 210 of the retailer computing device 150 is programmed to generate customer alerts in connection with the delivery of the products 190 to the customer or the person designated for receiving the products 190 by the customer. The customer alerts may be generated by the retailer computing device 150 based on information received from the UAV 110. In the embodiment shown in FIG. 1, the customer alerts may be transmitted from the retailer computing device 150 via the network 125 to the electronic computing device 120 or mobile computing device 170, and the electronic computing device 120 or mobile computing device 170 may transmit data responsive to the customer alerts and/or other data to the retailer computing device 150 via the network 125.

For example, the retailer computing device 150 may transmit a signal over the network 125 to the electronic computing device 120 or mobile computing device 170 including an alert indicating that the UAV 110 has arrived at the delivery location 180, or an alert indicating that the UAV 110 was unable to successfully land at the product drop off zone 182 due to an obstacle or another condition unfavorable for landing of the UAV 110. Similarly, the electronic computing device 120 or mobile computing device 170 may transmit a signal over the network 125 to the retailer computing device 150 including a notification that the product 190 ordered by the customer has been successfully retrieved at the product drop off zone 182 by the customer or person other than the customer from the UAV 110. In some embodiments, customer alerts sent to the electronic computing device 120 or mobile computing device 170 may include but are not limited to short message service (SMS) messages, electronic mail (e-mail) messages, instant messenger messages, voice mail messages, and/or push notifications (e.g., to a mobile app).

FIG. 3 presents a more detailed example of some embodiments of the UAV 310 of FIG. 1. In this example, the UAV 310 has a housing 302 that contains (partially or fully) or at least supports and carries a number of components. These components include a control unit 304 comprising a control circuit 306 that, like the control circuit 210 of the retailer computing device 150, controls the general operations of the UAV 310. The control unit 304 includes a memory 308 coupled to the control circuit 306 for storing data such as operating instructions and/or useful data.

In some embodiments, the control circuit 306 operably couples to a motorized leg system 310. This motorized leg system 310 functions as a locomotion system to permit the UAV 310 to land onto the ground or onto a landing pad at the product drop off zone 182 and/or to move laterally at the product drop off zone 182. An exemplary motorized leg system usable with the UAV 110 is described in U.S. Provisional Appl. No. 62/331,854, filed May 4, 2016, incorporated by reference herein in its entirety. Various examples of motorized leg systems are known in the art. Further elaboration in these regards is not provided here for the sake of brevity save to note that the control circuit 306 may be configured to control the various operating states of the motorized leg system 310 to thereby control when and how the motorized leg system 310 operates.

In the exemplary embodiment of FIG. 3, the control circuit 306 operably couples to at least one wireless transceiver 312 that operates according to any known wireless protocol. This wireless transceiver 312 can comprise, for example, a cellular-compatible, Wi-Fi-compatible, and/or Bluetooth-compatible transceiver that can wirelessly communicate with the retailer computing device 150 via the network 125. So configured, the control circuit 306 of the UAV 310 can provide information to the retailer computing device 150 (via the network 125) and can receive information and/or movement instructions from the retailer computing device 150. For example, the control circuit 306 can receive instructions from the retailer computing device 150 via the network 125 regarding directional movement (e.g., specific predetermined routes of movement) of the UAV 310 when transporting a product 190 to the delivery location 180, while landing at the product drop off zone 182, and/or while taking off from the product drop off zone 182. These teachings will accommodate using any of a wide variety of wireless technologies as desired and/or as may be appropriate in a given application setting. These teachings will also accommodate employing two or more different wireless transceivers 312, if desired.

In some embodiments, the wireless transceiver 312 is configured as a two-way transceiver that can receive the route instructions transmitted from the retailer computing device 150 and that can send one or more signals to the retailer computing device 150. For example, the retailer computing device 150 may be configured to analyze GPS coordinates of the delivery location 180 designated by the customer, to determine a route for the UAV 110 to the delivery location 180, and to transmit to the UAV 110 a signal over the network 125 including route instructions to guide the UAV 110 to the delivery location 180 along the determined route. In turn, the UAV 110, upon receipt of such a signal from the retailer computing device 150, is configured to navigate, based on the route instructions, to the delivery location 180 and/or drop off zone 182 while retaining the products 190 ordered by the customer therein.

In some embodiments, the wireless transceiver 312 of the UAV 110 is configured to transmit, via the network 125, a signal including an electronic confirmation that the product 190 ordered by the customer has been delivered by the UAV 110 to the customer or person other than the customer at the product drop off zone 182 designated by the customer or determined by the retailer computing device 150. In one approach, in response to receipt from the UAV 110 of the electronic confirmation that the product 190 ordered by the customer has been delivered to the product drop off zone 182, the retailer computing device 150 is configured to transmit, to the electronic computing device 120 or mobile computing device 170, an electronic alert that the product 190 ordered by the customer has been successfully delivered to the product drop off zone 182.

In some configurations, based on the route instructions or a separate signal received from the retailer computing device 150, the UAV 110 is configured to remain at the product drop off zone 182 while retaining the products 190 ordered by the customer therein for a period of time indicated in the route instructions or in the separate control signal. In some embodiments, the UAV 110 is configured to, in response to either a control signal from the retailer computing device 150, or a verification code entered by the customer or an intended delivery recipient other than the customer, to permit the customer or an intended delivery recipient other than the customer to retrieve the products 190 ordered by the customer from the interior of the UAV 110. According to some embodiments, the wireless transceiver 312 of the UAV 110 is also configured to transmit, via the network 125, a signal including an electronic confirmation that the product 190 ordered by the customer has been retrieved from the UAV 110 at the product drop off zone 182. In some approaches, in response to receipt of such an electronic confirmation from the UAV, the retailer computing device 150 is configured to transmit further route instructions to the UAV 110 to guide the UAV 110 back to a deployment station of the UAV 110, or to another delivery location 180.

In some configurations, based on the route instructions or a separate signal received from the retailer computing device 150, the UAV 110 is configured to configured to deliver the products 190 to a smart locker located at the product drop off zone 182. A smart locker will be understood to mean a storage receptacle where the UAV 110 can drop off the products 190 such that the products 190 may be retrieved from the smart locker at a later time (e.g., by a person other than the customer who placed the order) by way of an access code. In some embodiments, when the UAV 110 is at the product drop off zone 182 and is ready to drop off the products 190 at a smart locker, the UAV 110 is configured to transmit, via the wireless transceiver 312 an access code to the smart locker, such that the smart locker opens and permits the UAV 110 to drop off the products 190 into the interior of the locker. In one aspect, the smart locker closes after receiving a signal from the transceiver 312 of the UAV 110 indicating that the last product 190 to be loaded into the smart locker has been unloaded from the UAV 110 into the smart locker. Subsequently, the customer or an intended delivery recipient other than the customer, is permitted to access the smart locker by entering an access code, which may be transmitted to such an intended delivery recipient by the UAV 110 and/or by the retailer computing device 150.

The control circuit 306 also couples to one or more on-board sensors 314 of the UAV 310. These teachings will accommodate a wide variety of sensor technologies and form factors. By one approach, the on-board sensors 314 can comprise any relevant device that provides information to the UAV 310 to be used in navigation, landing, customer detection, potential threat detection, distance measurements, environment mapping, location determination, and/or other such sensor information. In some embodiments, the sensors 314 includes one or more devices that can be used to capture data related to one or more objects located within a threshold distance relative to the UAV 310. For example, the UAV 310 includes at least one on-board sensor 314 configured to detect at least one obstacle between the UAV 310 and the product drop off zone 182 at the delivery location 180 designated by the customer or determined by the retailer computing device 150. Based on the detection of one or more obstacles by such a sensor 314, the UAV 310 is configured to avoid the obstacle(s). In some embodiments, the UAV 310 may attempt to avoid detected obstacles, and if unable to avoid, to notify the retailer computing device 150 of such a condition. In some embodiments, using on-board sensors 314 (such as distance measurement units, e.g., laser or other optical-based distance measurement sensors), the UAV 310 detects obstacles in its path, and flies around such obstacles or stops until the obstacle is clear.

In some embodiments, the sensors 314 are configured to, for example, detect movement, measure temperature, capture images and/or video, capture thermographic, infrared, and/or multi spectral images, capture images of entities attempting to tamper with UAV 310, one or more accelerometers, one or more gyroscopes, one or more odometers, one or more location sensors, one or more microphones (e.g., which can be configured to capture audible authentication codes and/or voice prints, threatening language, verbal input from customers, verbal inquiries from customers, etc.), one or more distance measurement sensors (e.g., laser sensors, sonar sensors, sensors that measure distance by emitting and capturing a wireless signal (which can comprise light and/or sound) etc.), 3D scanning sensors, other such sensors, or a combination of two or more of such sensors.

In some aspects, the UAV 310 includes one or more sensors 314 in communication with one or more access panels of UAV 310 and/or positioned adjacent to such access panels to sense when such panels are tampered with. In some aspects, the UAV 310 includes one or more sensors 314 configured to detect the temperature in the cargo space of the UAV 310 and coupled to one or more controllers configured to raise or lower the temperature of the cargo space of the UAV 310 in order to preserve the freshness of the product 190 or to bring the product 190 to an appropriate consumption temperature.

In some aspects, the UAV 310 includes sensors 314 configured to recognize environmental elements at the delivery location 180 and/or the product drop off zone 182. Such sensors 314 can provide information that the control circuit 306 and/or the retailer computing device 150 can employ to determine a present location, distance, and/or orientation of the UAV 310 relative to one or more objects and/or surfaces at the delivery location 180 and/or drop off zone 182. These teachings will accommodate any of a variety of distance measurement units including optical units and sound/ultrasound units. In one example, a sensor 314 comprises an altimeter and/or a laser distance sensor device capable of determining a distance to objects in proximity to the sensor. Such information may be processed by the control circuit 306 and/or the retailer computing device 150 in order to determine, for example, whether to direct the UAV 310 to land at the product drop off zone 182, or whether to direct the UAV 310 not to land at the product drop off zone 182, but at a different spot at the delivery location 180. The UAV 310 may include an on-board sensor 314 in the form of a video camera configured to detect whether the product drop off zone 182 has sufficient space and surface conditions to accommodate the landing of the UAV 310 thereon. As mentioned above, the UAV 310 is configured in some embodiments to transmit (via the transceiver 312) still and/or moving images of the product drop off zone 182 acquired by a video camera on-board sensor 314 to the retailer computing device 150, which allows the retailer computing device 150 to analyze environmental elements at the product drop off zone 182 and to guide the landing of the UAV 110 at the product drop off zone 182 accordingly.

In some embodiments, an audio input 316 (such as a microphone) and/or an audio output 318 (such as a speaker) can also operably couple to the control circuit 306 of the UAV 310. So configured, the control circuit 306 can provide for a variety of audible sounds to enable the UAV 310 to communicate with, for example, the retailer computing device 150 or other UAVs. Such sounds can include any of a variety of tones and other non-verbal sounds. Such audible sounds can also include, in lieu of the foregoing or in combination therewith, pre-recorded or synthesized speech.

In the embodiment illustrated in FIG. 3, the UAV 310 includes a rechargeable power source 320 such as one or more batteries. The power provided by the rechargeable power source 320 can be made available to whichever components of the UAV 310 require electrical energy. By one approach, the UAV 310 includes a plug or other electrically conductive interface that the control circuit 306 can utilize to automatically connect to an external source of electrical energy (e.g., a charging dock) to recharge the rechargeable power source 320.

These teachings will also accommodate optionally selectively and temporarily coupling the UAV 310 to a landing pad at the product drop off zone 182. In such a case, the UAV 310 can include a landing pad coupling structure 322. In one aspect, a landing pad coupling structure 322 operably couples to a control circuit 306 to thereby permit the latter to control movement of the UAV 310 (e.g., via hovering and/or via the motorized leg system 310) towards a particular landing pad until the landing pad coupling structure 322 can engage the landing pad to thereby temporarily physically couple the UAV 310 to the landing pad. So coupled, the UAV 310 can then drop off the product 190 at the product drop off zone 182 and/or recharge its power source 320.

In some embodiments, the motorized transport unit 360 includes an input/output (I/O) device 330 that is coupled to the control circuit 306. The I/O device 330 allows an external device to couple to the control unit 304. The function and purpose of connecting devices will depend on the application. In some examples, devices connecting to the I/O device 330 may add functionality to the control unit 304, allow the exporting of data from the control unit 304, allow the diagnosing of the UAV 310, and so on.

In some embodiments, the UAV 310 includes a user interface 324 including for example, user inputs and/or user outputs or displays depending on the intended interaction with the user (e.g., a worker of a retailer or UAV delivery service). For example, user inputs could include any input device such as buttons, knobs, switches, touch sensitive surfaces or display screens, and so on. Example user outputs include lights, display screens, and so on. The user interface 324 may work together with or separate from any user interface implemented at an optional user interface unit (such as a smart phone or tablet device) usable by the worker.

In some embodiments, the UAV 310 may be controlled by a user in direct proximity to the UAV 310 (e.g., a driver of a moving vehicle used for deploying the UAV 310, or by a user at any location remote to the location of the UAV 310 (e.g., regional or central hub operator). This is due to the architecture of some embodiments where the retailer computing device 150 outputs the control signals to the UAV 310. These controls signals can originate at any electronic device in communication with the retailer computing device 150. For example, the movement signals sent to the UAV 310 may be movement instructions determined by the retailer computing device 150 and/or initially transmitted by a device of a user to the retailer computing device 150 and in turn transmitted from the retailer computing device 150 to the UAV 310.

The control unit 304 of the UAV 310 includes a memory 308 coupled to a control circuit 306 and storing data such as operating instructions and/or other data. The control circuit 306 can comprise a fixed-purpose hard-wired platform or can comprise a partially or wholly programmable platform. These architectural options are well known and understood in the art and require no further description. This control circuit 306 is configured (e.g., by using corresponding programming stored in the memory 308 as will be well understood by those skilled in the art) to carry out one or more of the steps, actions, and/or functions described herein. The memory 308 may be integral to the control circuit 306 or can be physically discrete (in whole or in part) from the control circuit 306 as desired. This memory 308 can also be local with respect to the control circuit 306 (where, for example, both share a common circuit board, chassis, power supply, and/or housing) or can be partially or wholly remote with respect to the control circuit 306. This memory 308 can serve, for example, to non-transitorily store the computer instructions that, when executed by the control circuit 306, cause the control circuit 306 to behave as described herein. It is noted that not all components illustrated in FIG. 3 are included in all embodiments of the UAV 310. That is, some components may be optional depending on the implementation.

Figure 4:
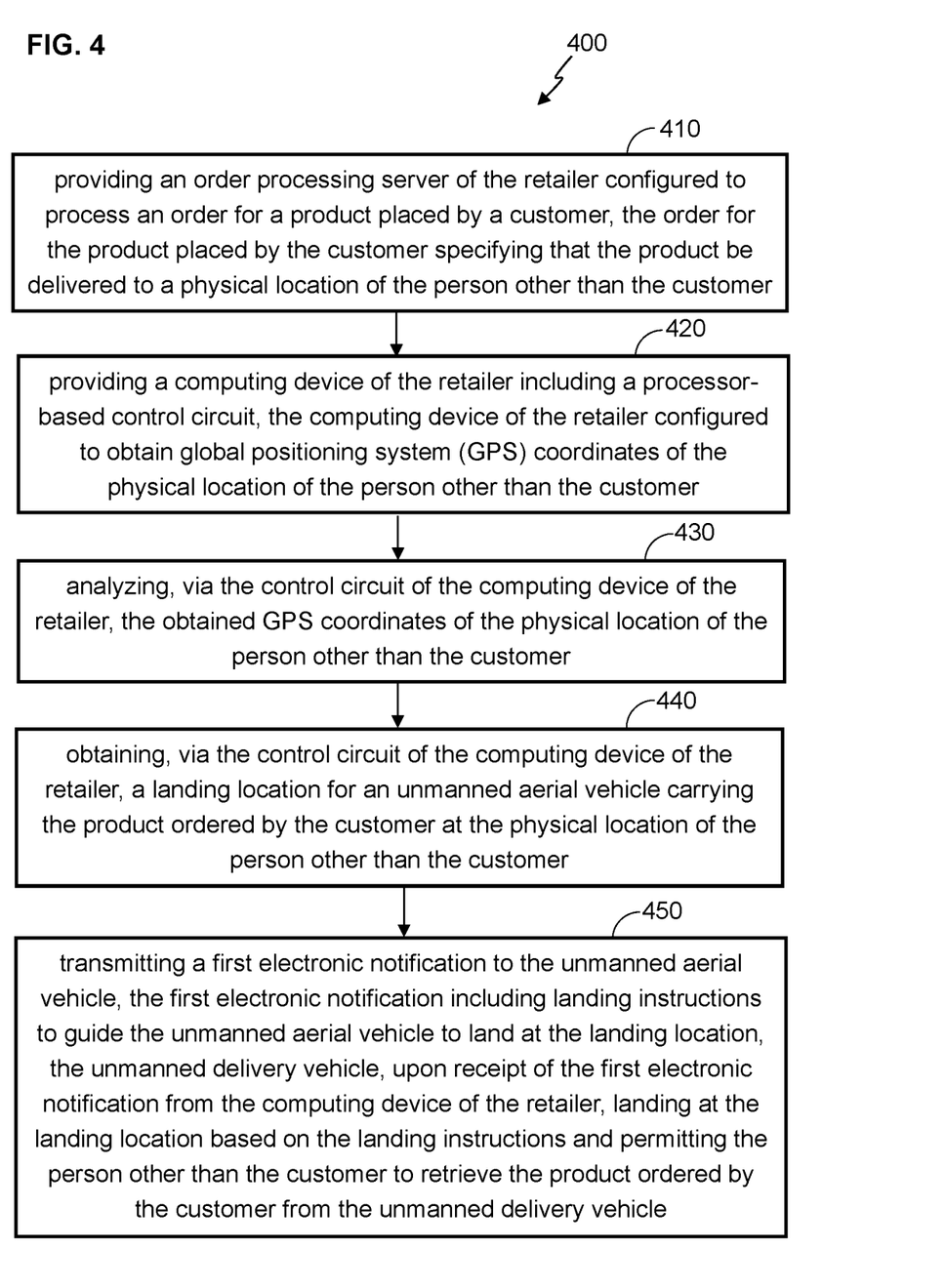
FIG. 4 is a flow chart diagram of a process of a method for facilitating delivery of products ordered by a customer of a retailer to a physical location of a person other than the customer of the retailer via an unmanned aerial vehicle in accordance with some embodiments.

FIG. 4 shows an embodiment of an exemplary method 400 of facilitating delivery of products 190 ordered by a customer of a retailer to a physical location 180 of a person other than the customer via a UAV 110. The embodiment of the method 400 illustrated in FIG. 4 includes providing an order processing server 130 of the retailer configured to process an order for a product 190 placed by a customer, with the order for the product 190 placed by the customer specifying that the product 190 be delivered via a UAV 110 to a physical location 180 of a person other than the customer (step 410). Of course, it will be appreciated that in some embodiments, the customer may not be prompted to specifically elect, when placing the order, that the order be delivered via a UAV 110, and instead may be permitted to only specify that the ordered product 190 be delivered to a customer-specified delivery location 180, or to a customer-specified person.

The exemplary method 400 of FIG. 4 further includes providing a computing device 150 of the retailer including a processor-based control circuit 210 and configured to obtain GPS coordinates of the physical location 180 of the person other than the customer to whom delivery of the product 190 ordered by the customer is intended (step 420). As discussed above, in some embodiments, when placing an order via the order processing server 130, the customer is permitted to specify that the product 190 being ordered by the customer be delivered to a customer-specified physical location 180 of a person other than the customer, or to a physical location 180 of a mobile computing device 170 of the person other than the customer, after which the retailer computing device 150 obtains GPS coordinates of the delivery location 180 and/or a product drop off zone 182 where the product 190 ordered by the customer is to be delivered and dropped off.

In some embodiments, the customer may speak or otherwise manually input via the graphical interface 122 of the electronic computing device 120, a zip code, address, town name, landmark, contact name, business name, event information, or any other information that can be sufficiently associated with a defined geographic location. An map-based image (e.g., satellite, aerial, or the like) of the geographic location generated based on the customer's input is then displayed to the customer via the graphical interface 122. The customer is permitted, via touchscreen and/or graphical input fields 124, to zoom, shift, rotate, and/or center the graphical map image of the geographic location as needed to refine the image, and to center an indicator (e.g., a cursor) on the desired delivery location. The customer is then permitted to select (e.g., press) a graphical "Deliver Here" button once the indicator is positioned in or over the delivery location desired by the customer. In one aspect, instead of having a separate "Deliver Here" button, the graphical interface 122 of the electronic computing device 120 includes an indicator in the form of a landing location button, which may be directly selected, touched, or clicked by the customer after the customer positions the indicator on the map at the desired delivery location 180.

After the customer presses the "Deliver Here" button, the electronic computing device 120 (whether a stationary kiosk or a mobile phone) transmits the location data indicating the customer's desired delivery location over the network 125 to the retailer computing device 150. In some embodiments, as discussed above, the control circuit 210 of the retailer computing device 150, after receipt of such location data, obtains and/or determines the GPS coordinates of the customer-selected delivery location 180. The control circuit 210 of the retailer computing device 150, in some configurations, obtains data indicating locations of other buildings, structures, obstructions, and/or no-fly zones associated with the delivery location 180, and determines a target landing zone (i.e., product drop off zone 182) within the confines of the delivery location 180. In some aspects, the target landing zone of the UAV 110 is 1 meter in radius, 2 meters in radius, 3 meters in radius, etc. After the product drop off zone 182 is determined by the control circuit 210 of the retailer computing device 150, the control circuit 210 causes the retailer computing device to send a signal over the network 125 that dispatches the UAV 110 to the delivery location 180 and/or the product drop off zone 182 as discussed above.

In some embodiments, the customer may speak or otherwise manually input via the graphical interface 122 of the electronic computing device 120, a phone number or other identifying information of a mobile computing device 170 of a person other than a customer to whom the customer desires that delivery of the product 190 be made. After the system 100 determines the precise GPS coordinates of the mobile computing device 170 of the other person, based on the customer's input, an image of the precise geographic location of the other person on a map is generated and displayed to the customer via the graphical interface 122. The customer is then permitted to select (e.g., press) a graphical "Deliver Here" button once an indicator showing the geographic location of the mobile computing device 170 is displayed on the map within the graphical interface 122.

In some embodiments, the retailer computing device 150 obtains GPS data associated with a fixed delivery location 180 selected by the customer. Such GPS data may be obtained by the retailer computing device 150 from the customer information database 140, for example. In some embodiments, the retailer computing device 150 obtains GPS data of a delivery location 180 associated with a location of a mobile computing device 170 of the person other than the customer to whom delivery is to be made. Given that the mobile computing device 170 is not stationary and its location may change when the person to whom delivery is to be made moves (e.g., walks, drives, etc.), the GPS data associated with the mobile computing device 170 can be obtained by the retailer computing device 150 in real-time according to some embodiments.

After the GPS coordinates of the delivery location 180 are obtained by the retailer computing device 150, the exemplary method 300 of FIG. 3 includes analyzing, via the control circuit 210 of the retailer computing device 150, the obtained GPS coordinates of the physical location of the person other than the customer (430). As described above, the UAV 110 is equipped with a transceiver that is configured to transmit GPS coordinates of the UAV 110 in real-time, as the UAV 110 is moving toward the delivery location 180. The GPS coordinates of the UAV 110 may be transmitted by the transceiver in real-time to the retailer computing device 150 directly, or may be transmitted for storage to the customer information database 140.

In one approach, after the retailer computing device 150 obtains the geographic coordinates of the UAV 110 that is attempting delivery and of the delivery location 180, the control circuit 210 of the retailer computing device 150 is programmed to analyze the relative geographic locations of the UAV 110 and the delivery location 180. To that end, the exemplary method of FIG. 3 includes determining a route for the UAV 110 to the physical location of the delivery location 180 designated by the customer. In some embodiments, the retailer computing device 150 determines one or more optimal travel route for the UAV 110 from the origin of travel (e.g., a deployment station) of the UAV 110 to the destination (e.g., the delivery location 180) of the UAV 110. In the embodiment depicted in FIG. 4, the determination of a delivery route for the UAV 110 includes obtaining, via the control circuit 210 of the retailer computing device 150, a product drop off zone 182 at the delivery location 180 for the UAV 110 carrying the product 190 ordered by the customer for a person other than the customer (step 440).

After the route of the UAV 110 to the delivery location 180 is determined and the product drop off zone 182 for the product 190 at the delivery location 180 is determined and/or obtained by the retailer computing device 150, the method 400 depicted in FIG. 4 further includes transmitting a first electronic notification to the UAV 110, the first electronic notification including landing instructions to guide the UAV 110 to land at the product drop off zone 182, such that the UAV 110 upon receipt of the first electronic notification from the retailer computing device 150, lands at the product drop off zone 182 based on the landing instructions and permits a person other than the customer to retrieve the product 190 ordered by the customer from the UAV 110 (step 450). As discussed above, it will be appreciated that the route instructions, after being determined by the retailer computing device 150, can be recalculated by the control circuit 210 of the retailer computing device 150 in real-time, for example, if an obstacle, no-fly zone, or another movement restriction is detected along the originally calculated route of the UAV 110, or if the customer (or person other than the customer) moves to a different location and such movement is detected by the system 100.

In some embodiments, prior to a the UAV 110 landing onto the product drop off zone 182, the UAV 110 snaps a digital still photo or acquires a digital video of the product drop off zone 182 and transmits this digital photo or video to the retailer computing device 150. In such embodiments, the control circuit 210 of the retailer computing device 150 analyzes the digital images and/or videos received from the UAV 110, and transmits a s signal over the network 125 to the UAV 110 that includes the landing instructions that guide the landing of the UAV 110 onto the product drop off zone 182 based on the received and analyzed digital images. In some aspects, as discussed above, the control circuit 210 of the retailer computing device 150 receives a first digital photograph of the product drop off zone 182 from the mobile computing device 170 (of a person other than the customer to whom delivery is being made) and a second digital photograph from the UAV 110 (via which delivery is made), and compares the first and second digital photographs to verify the environmental features of the product drop off zone 182, and transmits a signal to the UAV including the landing instructions that guide the landing of the UAV 110 onto the product drop off zone 182 based on the comparison of the first and second digital photographs.

In some embodiments, when the delivery to a person other than the customer of a product 190 ordered by the customer is being made (e.g., when the UAV 110 lands onto the product drop off zone 182 and/or hovers over the product drop off zone 182), the control circuit 210 of the retailer computing device 150 receives, via the network 125, an authentication of an identity of the person other than the customer at the product drop off zone 182. In one aspect, video camera sensor of the UAV 110 visually inspects an identifying characteristic (e.g., a physical identification card such as a Driver's License, a graphical interface 174 of the mobile computing device 170 of the person, or the facial features) of the person attempting to accept delivery of the product 190 in order to obtain identifying information of the person and then transmits this identifying information over the network 125 to the retailer computing device 150, which enables the retailer computing device 150 to authenticate the person by comparing the obtained identifying information to the verified information stored in the customer information database 140.

In some embodiments, an electronic notification transmitted by the retailer computing device 150 to the mobile computing device 170 of the person other than the customer includes a verification code that the person would be required to provide to the UAV 110 (either via the mobile computing device 170 or by manually entering via an interface of the UAV 110) in order to gain access to the product storage space of the UAV 110. As described above, instead of a verification code that must be entered or otherwise transmitted by the person attempting to accept delivery, the UAV 110 according to some embodiments is equipped with a sensor configured to detect biometric data associated with the person, enabling the verification of the customer via the biometric data detected by the sensor 114. As described above, the UAV 110, in response to either a control signal from the retailer computing device 150, or a verification code or biometric data entered by the person attempting to accept delivery, permits the authorized person to retrieve the product 190 ordered by the customer from the interior of the UAV 110.

For example, after the person other than the customer who is attempting to retrieve the product 190 from the UAV 110 is authenticated as an authorized person, the UAV 110 either opens its product storage space to permit the person to remove the product 190 from the UAV 110, or ejects the product 190 from the interior of the UAV 110 without opening the interior of the UAV 110 to access by the person. In some configurations, the UAV 110 is also configured to transmit, via the network 125, a signal including an electronic confirmation that the product 190 ordered by the customer has been retrieved by the person other than the customer from the UAV 110 at the product drop off zone 182 at the delivery location 180 designated by the customer.

In one approach, in response to receipt of such an electronic confirmation from the UAV 110, the retailer computing device 150 transmits a signal including updated route instructions to the UAV 110 to guide the UAV 110 back to a deployment station of the UAV 110, or to another product delivery location. In turn, the UAV 110, upon receipt of such a signal from the retailer computing device 150, navigates either back to the deployment station or to the next delivery destination based on the updated route instructions. In some embodiments, in response to receipt of the electronic confirmation from the UAV 110 that an authorized person other than the customer retrieved the product 190 from the UAV 110, the retailer computing device 150 transmits a signal to the order processing server 130 indicating that the order placed by the customer to have the product 190 delivered to the person other than the customer has been successfully completed.

The systems and methods described herein advantageously allow customers to purchase products from a retailer and have the products conveniently delivered to physical locations designated by the customers, where the products can be delivered to people other than the customers who placed the order. Such systems and methods provide a significant convenience for the customers of the retailer and are likely to increase customer loyalty to the retailer. In addition, such systems and methods provide retailers with significant operation cost savings, since deliveries are made via unmanned aerial vehicles that do not require a human operator.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating delivery of products ordered by a customer of a retailer to a physical location of a person other than the customer of the retailer via an unmanned aerial vehicle, the system comprising:
   an order processing server of the retailer configured to process an order for a product placed by a customer using an electronic computing device of the customer, wherein the order for the product placed by the customer specifies that the product be delivered by the unmanned aerial vehicle to a physical location of the person other than the customer who placed the order for the product using the electronic computing device of the customer;

a computing device of the retailer including a processor-based control circuit, the computing device of the retailer configured to obtain global positioning system (GPS) coordinates of the physical location of the person other than the customer;

wherein the control circuit is configured to:
analyze the obtained GPS coordinates of the physical location of the person other than the customer; and
determine a product drop off zone for the unmanned aerial vehicle carrying the product ordered by the customer at the physical location of the person other than the customer,
receive from a mobile computing device of the person other than the customer who placed the order for the product using the electronic computing device of the customer, a first digital photograph of the product drop off zone captured at the product drop off zone by the mobile computing device of the person other than the customer who placed the order for the product using the electronic computing device of the customer;
receive a second digital photograph of the product drop off zone from the unmanned aerial vehicle;
compare the first and second digital photographs to verify the product drop off zone; and
in response to a verification of the product drop off zone based on a comparison of the first and second digital photographs, transmit a first electronic notification to the unmanned aerial vehicle, the first electronic notification including landing instructions to guide the unmanned aerial vehicle to land at the product drop off zone; and wherein the unmanned delivery vehicle, upon receipt of the first electronic notification from the computing device of the retailer, is configured to land at the product drop off zone based on the landing instructions, and to permit the person other than the customer to retrieve the product ordered by the customer from the unmanned delivery vehicle.

2. The system of claim 1, wherein the order for the product placed by the customer specifies that the product be delivered to a physical location of a mobile computing device of the person other than the customer, and wherein the computing device of the retailer is configured to obtain global positioning system (GPS) coordinates of the physical location of the mobile computing device of the person other than the customer.

3. The system of claim 1, wherein the control circuit is configured to analyze the obtained GPS coordinates of the physical location of the person other than the customer and transmit a satellite image of the physical location of the person other than the customer to a graphical interface on an electronic computing device of the customer, and wherein the customer is permitted to at least one of zoom in on, shift, rotate, and center the satellite image in the graphical interface, and to place a cursor on the satellite image in the graphical interface to indicate the product drop off zone for the unmanned aerial vehicle.

4. The system of claim 3, wherein the control circuit is configured to receive a transmission from the electronic computing device of the customer, the transmission indicating the placement of the cursor on the satellite image in the graphical interface by the customer to indicate the product drop off zone for the unmanned aerial vehicle, and to transmit the first electronic notification to the unmanned aerial vehicle including the landing instructions based on the received transmission from the electronic computing device of the customer.

5. The system of claim 3, wherein the graphic interface on the electronic computing device of the customer includes a clickable product drop off zone location button, and the customer is permitted to click the product drop off zone location button after placement of the cursor on the satellite image in the graphical interface to indicate the product drop off zone for the unmanned aerial vehicle.

6. The system of claim 1, wherein the control circuit is further configured to receive, from the unmanned aerial vehicle, an electronic confirmation that the product ordered by the customer has been delivered to the person other than the customer at the physical location of the person other than the customer.

7. The system of claim 6, wherein in response to receipt, from the unmanned aerial vehicle, of the electronic confirmation that the product ordered by the customer has been delivered to the person other than the customer, the control circuit is further configured to transmit, to an electronic computing device of a customer, an electronic confirmation that the product ordered by the customer has been delivered to the person other than the customer at the physical location of the person other than the customer.

8. A method for facilitating delivery of products ordered by a customer of a retailer to a physical location of a person other than the customer of the retailer via an unmanned aerial vehicle, the method comprising:

providing an order processing server of the retailer;
processing, by the order processing server, an order for a product placed by a customer using an electronic computing device of the customer, the order for the product placed by the customer specifying that the product be delivered by the unmanned aerial vehicle to a physical location of the person other than the customer who placed the order for the product using the electronic computing device of the customer;
providing a computing device of the retailer including a processor-based control circuit, the computing device of the retailer configured to obtain global positioning system (GPS) coordinates of the physical location of the person other than the customer;
analyzing, via the control circuit of the computing device of the retailer, the obtained GPS coordinates of the physical location of the person other than the customer;
determining, via the control circuit of the computing device of the retailer, a product drop off zone for an unmanned aerial vehicle carrying the product ordered by the customer at the physical location of the person other than the customer;
receiving, by the computing device, from a mobile computing device of the person other than the customer who placed the order for the product using the electronic computing device of the customer, a first digital photograph of the product drop off zone captured at the product drop off zone by the mobile computing device of the person other than the customer who placed the order for the product using the electronic computing device of the customer;
receiving, by the computing device, a second digital photograph of the product drop off zone from the unmanned aerial vehicle;
comparing, by the computing device, the first and second digital photographs to verify the product drop off zone; and in response to a verification, by the computing device, of the product drop off zone based on the comparing of the first and second digital photographs, transmitting a first electronic notification to the unmanned aerial vehicle, the first electronic notification including landing instructions to guide the unmanned aerial vehicle to land at the product drop off zone, the unmanned delivery vehicle, upon receipt of the first electronic notification from the computing device of the retailer, landing at the product drop off zone based on the landing instructions and permitting the person other than the customer to retrieve the product ordered by the customer from the unmanned delivery vehicle.

9. The method of claim 8, wherein the order for the product placed by the customer specifies that the product be delivered to a physical location of a mobile computing device of the person other than the customer, and wherein the computing device of the retailer is configured to obtain global positioning system (GPS) coordinates of the physical location of the mobile computing device of the person other than the customer.

10. The method of claim 8, further comprising analyzing, via the control circuit of the computing device of the retailer, the obtained GPS coordinates of the physical location of the person other than the customer and transmit a satellite image of the physical location of the person other than the customer and transmitting, from the computing device of the retailer, a satellite image of the physical location of the person other than the customer to a graphical interface on an electronic computing device of the customer, and further comprising permitting the customer to at least one of zoom in on, shift, rotate, and center the satellite image in the graphical interface, and to place a cursor on the satellite image in the graphical interface to indicate the product drop off zone for the unmanned aerial vehicle.

11. The method of claim 10, further comprising receiving, via the control circuit of the computing device of the retailer, a transmission from the electronic computing device of the customer, the transmission indicating the placement of the cursor on the satellite image in the graphical interface by the customer to indicate the product drop off zone for the unmanned aerial vehicle, and transmitting, from the computing device of the retailer, the first electronic notification to the unmanned aerial vehicle including the landing instructions based on the received transmission from the electronic computing device of the customer.

12. The method of claim 10, further comprising providing a clickable drop off zone location button in the graphic interface on the electronic computing device of the customer, and permitting the customer to click the product drop off zone location button after placement of the cursor on the satellite image in the graphical interface to indicate the drop off zone for the unmanned aerial vehicle.

13. The method of claim 8, further comprising receiving, via the control circuit of the computing device of the retailer, from the unmanned aerial vehicle, an electronic confirmation that the product ordered by the customer has been delivered to the person other than the customer at the physical location of the person other than the customer.

14. The method of claim 13, further comprising transmitting, via the control circuit and in response to receipt, from the unmanned aerial vehicle, of the electronic confirmation that the product ordered by the customer has been delivered to the person other than the customer, an electronic confirmation that the product ordered by the customer has been delivered to the person other than the customer at the physical location of the person other than the customer.

\* \* \* \* \*